US011699906B2

(12) United States Patent
Yu et al.

(10) Patent No.: US 11,699,906 B2
(45) Date of Patent: Jul. 11, 2023

(54) STRING INVERTER CONTROL METHOD, APPARATUS, AND SYSTEM, AND STORAGE MEDIUM

(71) Applicant: Huawei Digital Power Technologies Co., Ltd., Shenzhen (CN)

(72) Inventors: Xinyu Yu, Shanghai (CN); Kai Xin, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 17/556,045

(22) Filed: Dec. 20, 2021

(65) Prior Publication Data
US 2022/0115873 A1 Apr. 14, 2022

Related U.S. Application Data

(63) Continuation of application No. PCT/CN2020/111435, filed on Aug. 26, 2020.

(30) Foreign Application Priority Data

Sep. 9, 2019 (CN) .......................... 201910848724.4

(51) Int. Cl.
  *H02J 3/38* (2006.01)
  *H02M 7/44* (2006.01)
  *H02S 40/32* (2014.01)
(52) U.S. Cl.
  CPC .............. *H02J 3/381* (2013.01); *H02M 7/44* (2013.01); *H02S 40/32* (2014.12); *H02J 2300/24* (2020.01)

(58) Field of Classification Search
  CPC ........ H02J 3/381; H02J 2300/24; H02M 7/44; H02M 1/007; H02M 3/158; H02M 7/48;
  (Continued)

(56) References Cited

U.S. PATENT DOCUMENTS

2010/0020576 A1 1/2010 Falk
2013/0113452 A1 5/2013 Reichard et al.
(Continued)

FOREIGN PATENT DOCUMENTS

CN 105680797 A 6/2016
CN 106712716 A 5/2017
(Continued)

*Primary Examiner* — Toan T Vu
(74) *Attorney, Agent, or Firm* — Womble Bond Dickinson (US) LLP

(57) ABSTRACT

A string inverter control method includes: in a process of performing IV curve scanning on one or more first direct current/direct current step-up circuits, controlling a change of an output voltage of one or more second direct current/direct current step-up circuits on which the IV curve scanning does not need to be performed, where a change trend of the output voltage and a change trend of an input voltage of the one or more first direct current/direct current step-up circuits on which the IV curve scanning is performed present a non-strictly monotonically increasing relationship. Therefore, for the direct current/direct current step-up circuit on which the IV curve scanning is performed, a voltage difference between two ends of the direct current/direct current step-up circuit is not always in a relatively high state, so that a ripple current on an input inductor in the direct current/direct current step-up circuit can be reduced.

19 Claims, 9 Drawing Sheets

(58) Field of Classification Search
CPC ........ H02M 1/14; H02M 7/12; H02M 1/0074;
H02S 40/32; G05F 1/67
See application file for complete search history.

(56) References Cited

U.S. PATENT DOCUMENTS

2017/0012436 A1* 1/2017 Mende .................... H02J 3/381
2017/0294877 A1 10/2017 Chang et al.
2018/0234051 A1 8/2018 Ni et al.
2019/0123683 A1 4/2019 Al Shakarchi et al.
2019/0354129 A1* 11/2019 Laschinski ................ G05F 1/67

FOREIGN PATENT DOCUMENTS

| CN | 107017836 A | 8/2017 |
| CN | 107196604 A | 9/2017 |
| CN | 107508551 A | 12/2017 |
| CN | 104333215 B | 7/2018 |
| CN | 108879756 A | 11/2018 |
| CN | 109818495 A | 5/2019 |
| CN | 110719038 A | 1/2020 |
| JP | H0928084 A | 1/1997 |
| JP | 2014155332 A | 8/2014 |
| JP | 2014161204 A | 9/2014 |
| JP | 2019144953 A | 8/2019 |

* cited by examiner

STRING INVERTER CONTROL METHOD, APPARATUS, AND SYSTEM, AND STORAGE MEDIUM

CROSS-REFERENCE TO RELATED APPLICATIONS

This application is a continuation of International Application No. PCT/CN2020/111435, filed on Aug. 26, 2020, which claims priority to Chinese Patent Application No. 201910848724.4, filed on Sep. 9, 2019. The disclosures of the aforementioned applications are hereby incorporated by reference in their entireties.

TECHNICAL FIELD

This application relates to the field of photovoltaic technologies, and in particular, to a string inverter control method, apparatus, and system, and a storage medium.

BACKGROUND

A photovoltaic power generation system is a power generation system that converts solar energy into electric energy and transfers the electric energy obtained through conversion to a power grid. The photovoltaic power generation system includes a plurality of photovoltaic strings. Each photovoltaic string includes a plurality of photovoltaic modules connected in series. The photovoltaic module is a direct current power supply obtained by encapsulating a plurality of solar cells. A current-voltage (IV) curve of the photovoltaic string is used to indicate a relationship between an output current and an output voltage of the photovoltaic string when the output voltage of the photovoltaic string decreases from an open-circuit voltage to a short-circuit voltage. The IV curve of the photovoltaic string can be used to detect a health status of the photovoltaic string, to provide a basis for operation and maintenance of the photovoltaic string. Therefore, in a process of supplying power to the power grid by using the photovoltaic power generation system, an IV curve of each photovoltaic string needs to be obtained. A process of obtaining an IV curve of a photovoltaic string is generally referred to as an IV curve scanning process.

As shown in FIG. 1, a photovoltaic power generation system 100 includes a plurality of photovoltaic strings 101 and a string inverter 102. FIG. 1 shows one string inverter 102. The photovoltaic power generation system 100 may include a plurality of string inverters 102 shown in FIG. 1. As shown in FIG. 1, the string inverter 102 includes a plurality of direct current/direct current (DC/DC) step-up circuits 1021 and one inverter circuit 1022. An input end of each direct current/direct current step-up circuit 1021 is connected to output ends of two photovoltaic strings 101. Output ends of the plurality of direct current/direct current step-up circuits 1021 are connected in parallel and then connected to an input end of the inverter circuit 1022. An output end of the inverter circuit 1022 is configured to supply power to the power grid. For each direct current/direct current step-up circuit 1021, an input voltage of the direct current/direct current step-up circuit 1021 is an output voltage of connected photovoltaic strings. Therefore, an IV curve of the photovoltaic strings connected to the direct current/direct current step-up circuit 1021 may be obtained by controlling a change of the input voltage of the direct current/direct current step-up circuit 1021, that is, controlling IV curve scanning performed on the direct current/direct current step-up circuit 1021.

In a related technology, if IV curve scanning needs to be performed on photovoltaic strings connected to a $1^{st}$ direct current/direct current step-up circuit 1021 in FIG. 1, an open-circuit voltage and a short-circuit voltage of two photovoltaic strings that are connected in parallel and that are connected to the $1^{st}$ direct current/direct current step-up circuit 1021 are first obtained. An input voltage of the $1^{st}$ direct current/direct current step-up circuit 1021 is controlled to decrease from the open-circuit voltage to the short-circuit voltage. In a change process of the input voltage of the $1^{st}$ direct current/direct current step-up circuit 1021, an input current of the $1^{st}$ direct current/direct current step-up circuit 1021 is detected and recorded. An IV curve of the photovoltaic strings connected to the $1^{st}$ direct current/direct current step-up circuit 1021 is drawn based on the input current of the $1^{st}$ direct current/direct current step-up circuit 1021 in the change process of the input voltage of the $1^{st}$ direct current/direct current step-up circuit 1021. In a process of performing the IV curve scanning on the photovoltaic strings connected to the $1^{st}$ direct current/direct current step-up circuit 1021, an input voltage of another direct current/direct current step-up circuit 1021 other than the $1^{st}$ direct current/direct current step-up circuit 1021 in FIG. 1 is controlled to be 0. In other words, the another direct current/direct current step-up circuit 1021 does not output power to the inverter circuit 102.

In the foregoing IV curve obtaining process, because the another direct current/direct current step-up circuit does not output power to the inverter circuit, power transferred by the inverter circuit to the power grid is much less than power output during normal operation, resulting in a relatively large loss in electric energy yield of the photovoltaic power generation system in the IV curve scanning process.

SUMMARY

This application provides a string inverter control method, apparatus, and system, and a storage medium, to avoid an excessive loss of an electric energy yield of a photovoltaic power generation system in an IV curve scanning process. The technical solutions are as follows:

According to a first aspect, a string inverter control method is provided. A string inverter includes one or more first direct current/direct current step-up circuits, one or more second direct current/direct current step-up circuits, and an inverter circuit. The one or more first direct current/direct current step-up circuits are direct current/direct current step-up circuits on which current-voltage IV curve scanning is performed. The one or more second direct current/direct current step-up circuits are direct current/direct current step-up circuits on which IV curve scanning is not performed. The method includes:

in a process of controlling the IV curve scanning performed on the one or more first direct current/direct current step-up circuits, controlling output power of the inverter circuit to be reference power; and in the process of controlling the IV curve scanning performed on the one or more first direct current/direct current step-up circuits, controlling a change of an output voltage of the one or more second direct current/direct current step-up circuits, where a change trend of the output voltage of the one or more second direct current/direct current step-up circuits and a change trend of an input voltage of the one or more first direct current/direct current step-up circuits in the IV curve scanning process present a non-strictly monotonically increasing relationship, and non-strictly monotonically increasing indicates that a dependent variable may increase or may remain unchanged when an independent variable increases.

The string inverter control method provided in an embodiment of the application may be used to implement at least the following technical effects:

(1) In the IV curve scanning process, the output power of the inverter circuit included in the string inverter is controlled to be the reference power, and the change of the output voltage of the one or more second direct current/direct current step-up circuits included in the string inverter is controlled. In other words, in the IV curve scanning process, for a direct current/direct current step-up circuit on which the IV curve scanning does not need to be performed, the direct current/direct current step-up circuit still transfers power to the inverter circuit, to avoid an excessive loss of an electric energy yield of a photovoltaic power generation system in the IV curve scanning process.

(2) In the IV curve scanning process, the output power of the inverter circuit included in the string inverter is controlled to be the reference power. In this way, even if the IV curve scanning is performed on a photovoltaic string in the string inverter, power of electric energy transferred from the photovoltaic power generation system to a power grid is fixed, to ensure normal operation of the power grid.

(3) The process of performing the IV curve scanning on the one or more first direct current/direct current step-up circuits is usually implemented through controlling the input voltage of the one or more first direct current/direct current step-up circuits to change from a reference open-circuit voltage to a reference short-circuit voltage. An output voltage of a direct current/direct current step-up circuit is usually higher than an input voltage of the direct current/direct current step-up circuit. Therefore, in the process of performing the IV curve scanning on these first direct current/direct current step-up circuits, if a bus voltage at an input end of the inverter circuit is controlled to be fixed, the bus voltage at the input end of the inverter circuit needs to be greater than the reference open-circuit voltages of these first direct current/direct current step-up circuits. In this case, in the process of scanning the input voltages of these direct current/direct current step-up circuits, the bus voltage at the input end of the inverter circuit is always in a relatively high state. Therefore, when scanning is performed near the reference short-circuit voltage in the process of performing the IV curve scanning on these first direct current/direct current step-up circuits, a voltage difference between two ends of each first direct current/direct current step-up circuit is relatively large, and positive correlation exists between a ripple current on an input inductor in each first direct current/direct current step-up circuit and a voltage difference between two ends of the input inductor. In this case, the ripple current on the input inductor in each first direct current/direct current step-up circuit is relatively large, and overcurrent protection of the input inductor is easily triggered. After the overcurrent protection is triggered, the first direct current/direct current step-up circuits are automatically disconnected. Therefore, the IV curve scanning process cannot continue.

Therefore, in an embodiment of the application, in the IV curve scanning process, the change of the output voltage of the second direct current/direct current step-up circuit included in the string inverter is controlled. Because the output voltage of the second direct current/direct current step-up circuit included in the string inverter is also the bus voltage at the input end of the inverter circuit, in the IV curve scanning process, the bus voltage at the input end of the inverter circuit changes, and a change trend and the change trend of the input voltage of the one or more first direct current/direct current step-up circuits in the IV curve scanning process present the non-strictly monotonically increasing relationship. Therefore, in a process in which the input voltage of the one or more first direct current/direct current step-up circuits decreases from the reference open-circuit voltage to the short-circuit voltage, the bus voltage at the input end of the inverter circuit also presents a decreasing trend. In this case, for the first direct current/direct current step-up circuit on which the IV curve scanning is performed, the voltage difference between the two ends of the first direct current/direct current step-up circuit is not always in the relatively high state, so that the ripple current on the input inductor in the first direct current/direct current step-up circuit can be reduced. In this way, the following case can be avoided: Overcurrent protection is triggered on the first direct current/direct current step-up circuit due to the excessively large ripple current on the input inductor. Normal operation of the string inverter is ensured in the IV curve scanning process.

In a possible example, in the process of performing the IV curve scanning on the one or more first direct current/direct current step-up circuits, the controlling a change of an output voltage of the one or more second direct current/direct current step-up circuits includes: in the process of performing the IV curve scanning on the one or more direct current/direct current step-up circuits, for any second direct current/direct current step-up circuit in the one or more second direct current/direct current step-up circuits, adjusting an actual value of an output voltage of the second direct current/direct current step-up circuit at each moment based on a reference value of the output voltage of the second direct current/direct current step-up circuit at the same moment, until an absolute value of a difference between the actual value of the output voltage of the second direct current/direct current step-up circuit at each moment and the reference value of the output voltage at the same moment is less than a difference threshold. Herein, a change trend of reference values of output voltages of the second direct current/direct current step-up circuit at all moments in the IV curve scanning process and a change trend of input voltages of the one or more first direct current/direct current step-up circuits at all the moments in the IV curve scanning process present a non-strictly monotonically increasing relationship.

The change trend of the input voltage of the one or more first direct current/direct current step-up circuits in the IV curve scanning process is preset. Therefore, a reference value of an output voltage of a direct current/direct current step-up circuit on which the IV curve scanning does not need to be performed may be preset based on a change status of an input voltage in the IV curve scanning process. In this case, during the subsequent IV curve scanning, an actual value of the output voltage of the direct current/direct current step-up circuit on which the IV curve scanning does not need to be performed is adjusted directly based on the preset reference value of the output voltage, to control a change of the output voltage of the direct current/direct current step-up circuit on which the IV curve scanning does not need to be performed, thereby improving control efficiency in the IV curve scanning process.

In a possible example, the adjusting an actual value of an output voltage of the second direct current/direct current step-up circuit at each moment based on a reference value of the output voltage of the second direct current/direct current step-up circuit at the same moment includes:

for any moment in the IV curve scanning process, if a difference between the reference value of the output voltage at the moment and the actual value of the output voltage of the second direct current/direct current step-up circuit at the moment is greater than the reference threshold, increasing power extracted by the second direct current/direct current step-up circuit from a connected photovoltaic string; or if a difference between the reference value of the output voltage at the moment and the actual value of the output voltage of the second direct current/direct current step-up circuit at the moment is greater than the reference threshold, reducing power extracted by the second direct current/direct current step-up circuit from a connected photovoltaic string.

In an embodiment of the application, because the direct current/direct current step-up circuit on which the IV curve scanning does not need to be performed still transfers power to the inverter circuit, the power extracted by the direct current/direct current step-up circuit from the connected photovoltaic string may be adjusted, to adjust the change of the output voltage of the direct current/direct current step-up circuit, thereby improving control efficiency in the IV curve scanning process.

In a possible example, the method further includes: before the IV curve scanning performed on the one or more first direct current/direct current step-up circuits included in the string inverter is controlled, obtaining voltage values that need to be met by the one or more first direct current/direct current step-up circuits at a plurality of moments in the IV curve scanning process; and for any first moment and any second moment in the plurality of moments, if a voltage value that is of the input voltage of the one or more first direct current/direct current step-up circuits and that needs to be met at the first moment is greater than a voltage value that needs to be met at the second moment, setting a reference value of an output voltage of any second direct current/direct current step-up circuit at the first moment to be greater than or equal to a reference value of an output voltage at the second moment.

In the foregoing process, the reference value of the output voltage of the direct current/direct current step-up circuit on which the IV curve scanning does not need to be performed may be preconfigured. Therefore, during the subsequent IV curve scanning, the change of the output voltage of the direct current/direct current step-up circuit on which the IV curve scanning does not need to be performed is controlled, thereby improving control efficiency in the IV curve scanning process.

In a possible example, the method further includes: in the process of controlling the IV curve scanning performed on the one or more first direct current/direct current step-up circuits, controlling a change of a switching frequency of the one or more first direct current/direct current step-up circuits, where a change trend of the switching frequency and the change trend of the input voltage of the one or more first direct current/direct current step-up circuits in the IV curve scanning process present a non-strictly monotonically decreasing relationship.

To further reduce the ripple current on the input inductor in the direct current/direct current step-up circuit on which the IV curve scanning is performed, in the IV curve scanning process, the change of the switching frequency of the direct current/direct current step-up circuit may be further controlled. In this way, the following case can be avoided: Overcurrent protection is triggered on the direct current/direct current step-up circuit due to the excessively large ripple current on the input inductor. Normal operation of the string inverter is ensured in the IV curve scanning process.

In a possible example, the controlling a change of a switching frequency of each of the one or more first direct current/direct current step-up circuits includes: for any first direct current/direct current step-up circuit in the one or more first direct current/direct current step-up circuits, at any moment in a plurality of moments in the IV curve scanning process, if an input voltage of the first direct current/direct current step-up circuit at the moment is less than an input voltage of the first direct current/direct current step-up circuit at a previous moment, adjusting a switching frequency of the first direct current/direct current step-up circuit at the moment to be greater than or equal to a switching frequency of the first direct current/direct current step-up circuit at the previous moment; or if an input voltage of the first direct current/direct current step-up circuit at the moment is greater than an input voltage of the first direct current/direct current step-up circuit at a previous moment, adjusting a switching frequency of the first direct current/direct current step-up circuit at the moment to be less than or equal to a switching frequency of the first direct current/direct current step-up circuit at the previous moment.

Based on the foregoing example, in the IV curve scanning process, the switching frequency of the direct current/direct current step-up circuit can be quickly adjusted, thereby improving control efficiency in the IV curve scanning process.

In a possible example, the method further includes: before the IV curve scanning is performed on the one or more first direct current/direct current step-up circuits, obtaining maximum input power of each direct current/direct current step-up circuit included in the string inverter; determining a sum of maximum input power of all of the direct current/direct current step-up circuits included in the string inverter; multiplying the determined sum value by a power loss coefficient to obtain theoretical output power; and determining the reference power based on the theoretical output power, where a difference between the reference power and the theoretical output power is less than a power threshold.

In an embodiment of the application, based on the foregoing example, the reference power that needs to be met by the output power of the inverter circuit in the IV curve scanning process can be determined, to avoid an excessive loss of an electric energy yield of a photovoltaic power generation system in the IV curve scanning process.

According to a second aspect, a string inverter control method is provided. A string inverter includes one or more first direct current/direct current step-up circuits, one or more second direct current/direct current step-up circuits, and an inverter circuit. The one or more first direct current/direct current step-up circuits are direct current/direct current step-up circuits on which current-voltage IV curve scanning is performed. The one or more second direct current/direct current step-up circuits are direct current/direct current step-up circuits on which IV curve scanning is not performed. The method includes:

in a process of controlling the IV curve scanning performed on the one or more first direct current/direct current step-up circuits, controlling output power of the inverter circuit to be reference power; and in the process of controlling the IV curve scanning performed on the one or more first direct current/direct current step-up circuits, controlling a change of a switching frequency of the one or more first direct current/direct current step-up circuits, where a change trend of the switching frequency and a change trend of an input voltage of the one or more first direct current/direct current step-up circuits in the IV curve scanning process present a non-strictly monotonically decreasing relationship.

In an embodiment of the application, in the IV curve scanning process, the change of the switching frequency of the direct current/direct current step-up circuit may be independently controlled, and a bus voltage at an input end of the inverter circuit does not need to be controlled. In this way, the following case can be avoided: Overcurrent protection is triggered on the direct current/direct current step-up circuit due to an excessively large ripple current on an input inductor. Normal operation of the string inverter is ensured in the IV curve scanning process.

According to a third aspect, a string inverter control apparatus is provided. The apparatus has a function of implementing operations in the string inverter control method in the first aspect. The apparatus includes at least one module. The at least one module is configured to implement the string inverter control method provided in the first aspect or the second aspect.

According to a fourth aspect, a string inverter controller is provided. The controller is configured to perform the string inverter control method provided in the first aspect or the second aspect.

According to a fifth aspect, a string inverter control system is provided. The system includes a string inverter and a controller.

The controller is connected to each of direct current/direct current step-up circuits included in the string inverter. The controller is configured to perform the string inverter control method provided in the first aspect or the second aspect.

According to a sixth aspect, a computer readable storage medium is provided. The computer readable storage medium stores instructions. When the instructions are run on a computer, the computer is enabled to perform the string inverter control method provided in the first aspect or the second aspect.

According to a seventh aspect, a computer program product including instructions is provided. When the instructions are run on a computer, the computer is enabled to perform the string inverter control method provided in the first aspect or the second aspect.

Technical effects achieved in the second aspect, the third aspect, the fourth aspect, the fifth aspect, the sixth aspect, and the seventh aspect are similar to technical effects achieved by using corresponding technical means in the first aspect. Details are not described herein again.

DESCRIPTION OF EMBODIMENTS

To make the objectives, technical solutions, and advantages of this application clearer, the following further describes embodiments of the application in detail with reference to the accompanying drawings.

Before an IV curve obtaining method provided in the embodiments of this application is described, an application scenario in the embodiments of this application is first described.

The photovoltaic power generation industry develops rapidly in recent years. A photovoltaic power generation system includes a plurality of components such as a photovoltaic string, an inverter, a transformer, and a cable. The photovoltaic string can convert solar energy into electric energy. A health status of the photovoltaic string directly determines how much electric energy the photovoltaic power generation system can generate. When temperature and light intensity are fixed, an IV curve may be drawn based on a change status between an output current and an output voltage of the photovoltaic string.

Figure 2:
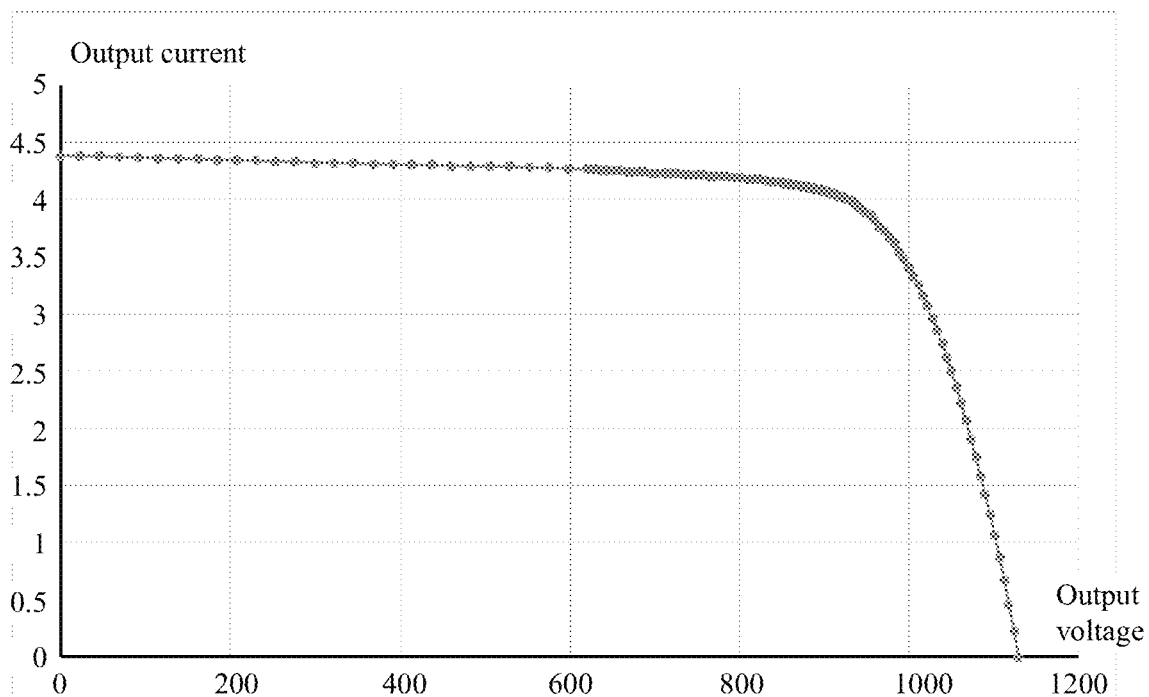
FIG. 2 is a schematic diagram of an IV curve according to an embodiment of this application.

As shown in FIG. 2, an IV curve of a healthy photovoltaic string is parabolic. The output voltage of the photovoltaic string is controlled to be scanned from an open-circuit voltage to a short-circuit voltage, to obtain a curve relationship between the output current and the output voltage of the photovoltaic string. This technology is also an IV curve scanning technology of the photovoltaic string. If the photovoltaic string is damaged or the photovoltaic string is shielded, the IV curve is distorted. The IV curve can be used to detect the health status of the photovoltaic string, to provide a basis for operation and maintenance of the photovoltaic string.

Currently, an IV curve obtaining technology applied in the photovoltaic industry may be divided into two types: an offline IV curve scanning technology and an online IV curve scanning technology. The offline IV curve scanning technology requires that an operation and maintenance engineer manually carries an IV curve detector near the photovoltaic string, disconnects the photovoltaic string from the inverter, and then connects the photovoltaic string to the IV curve detector for detection. Because each photovoltaic string needs to be manually detected, detection performed on an entire power station takes a very long time. In addition, because the photovoltaic string needs to be disconnected from the inverter, a power loss of the photovoltaic power generation system is relatively large during the detection.

Different from the offline IV curve scanning technology, the online IV curve scanning technology uses the inverter to implement the IV curve scanning on the connected photovoltaic string, to avoid a cumbersome process of manual detection and cable connection changing and to greatly reduce the power loss of the photovoltaic power generation system during the scanning. For photovoltaic power generation systems using different types of inverters, the online IV curve scanning technology may be further subdivided into an online IV curve scanning technology based on a string inverter and an online IV curve scanning technology based on a central inverter.

Figure 3:
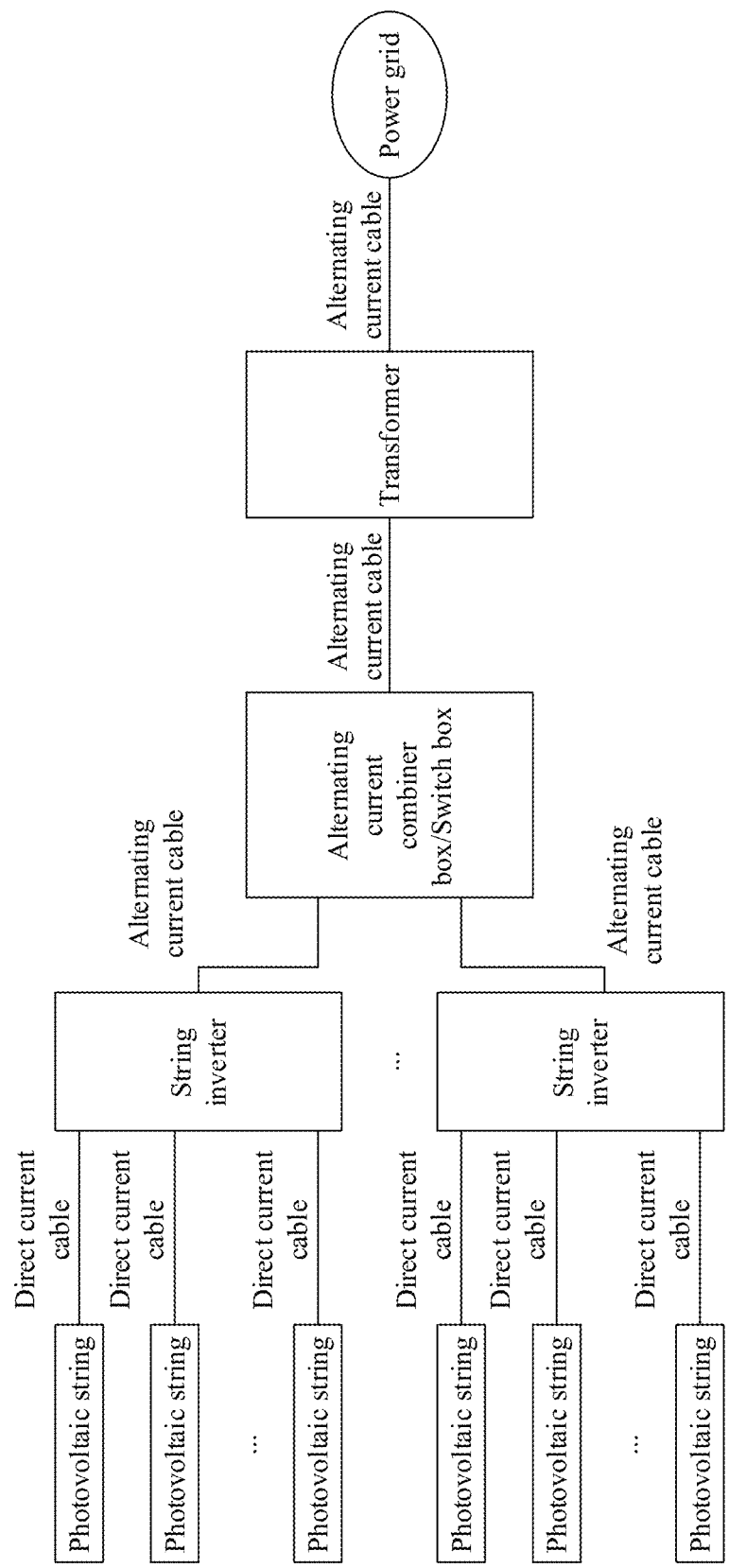
FIG. 3 is a schematic diagram of another photovoltaic power generation system according to an embodiment of this application.

The online IV curve scanning technology based on a string inverter is applicable to a photovoltaic power generation system based on a string inverter. FIG. 3 is a schematic diagram of another photovoltaic power generation system according to an embodiment of this application. As shown in FIG. 3, the photovoltaic power generation system includes a plurality of string inverters, an alternating current combiner box/switch box, and a transformer. A direct current side of each string inverter is connected to a photovoltaic string. An alternating current side of each string inverter is connected to the alternating current combiner box/switch box. The alternating current combiner box/switch box is connected to the transformer. The transformer supplies power to a power grid through an alternating current cable.

For the photovoltaic string connected to each string inverter, an input voltage of the string inverter may be controlled to implement an effect of scanning an output voltage of the photovoltaic string, to obtain an IV curve of the photovoltaic string.

In addition, an example in which the photovoltaic power generation system shown in FIG. 3 includes only two string inverters is used for description. An embodiment of the application does not limit a quantity of string inverters included in the photovoltaic power generation system.

Figure 4:
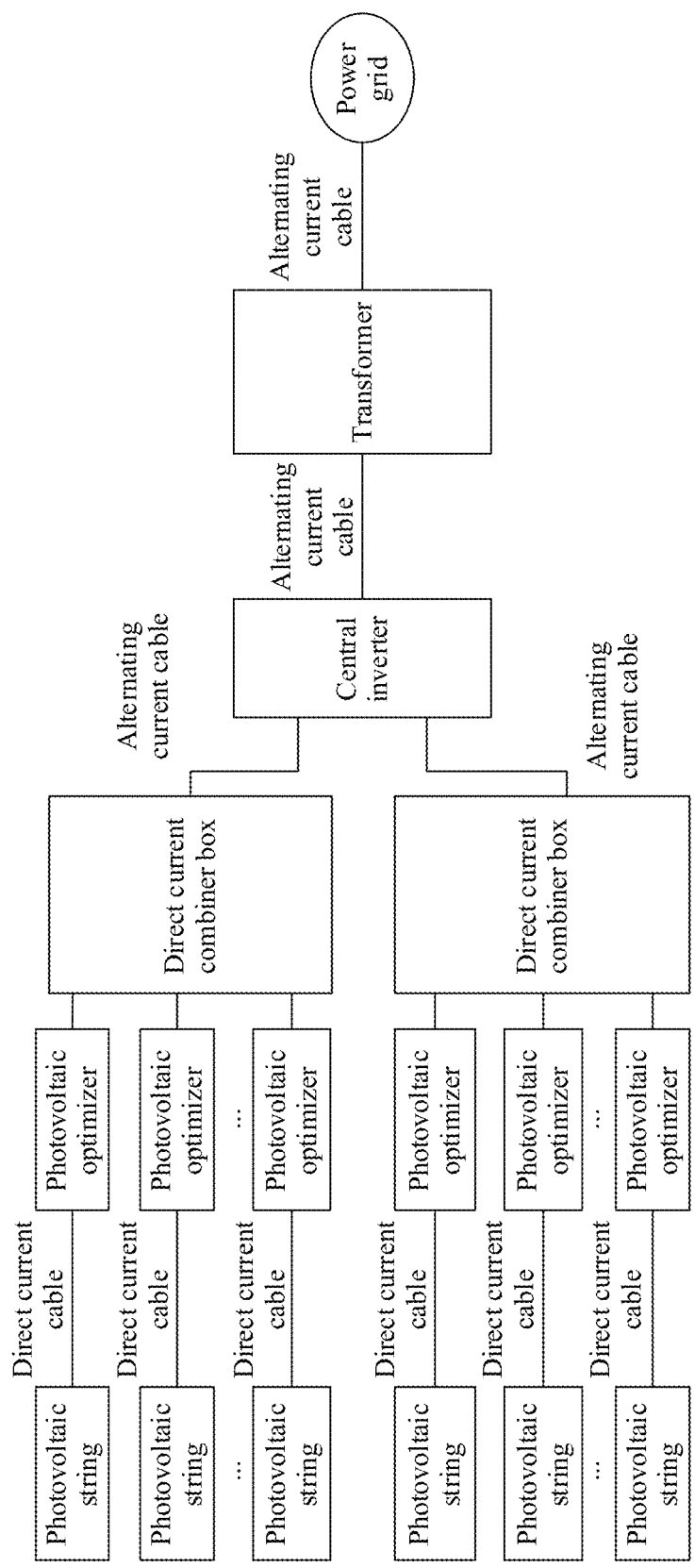
FIG. 4 is a schematic diagram of another photovoltaic power generation system according to an embodiment of this application.

The online IV curve scanning technology based on a central inverter is applicable to a photovoltaic power generation system based on a central inverter. FIG. 4 is a schematic diagram of another photovoltaic power generation system according to an embodiment of this application. As shown in FIG. 4, the photovoltaic power generation system includes one central inverter and a plurality of direct current combiner boxes. Each direct current combiner box is connected to a plurality of photovoltaic strings. Because the photovoltaic power generation system includes only one central inverter, the central inverter is generally deployed in an independent equipment room. In this case, an electrical distance between the central inverter and the photovoltaic string is relatively long, and an output voltage of the photovoltaic string cannot be directly controlled. Therefore, a photovoltaic optimizer needs to be connected to an output end of the photovoltaic string, and the output voltage of the photovoltaic string is controlled by using the photovoltaic optimizer, to implement IV curve scanning on the photovoltaic string. Because the photovoltaic optimizer needs to be additionally added in the photovoltaic power generation system, a structure of the photovoltaic power generation system is more complex, thereby increasing the costs. In addition, the IV curve scanning requires coordinated control between the central inverter and the photovoltaic optimizer, and highly depends on remote accurate communication between the central inverter and the photovoltaic optimizer. A control policy is complex and is prone to communication interference.

Figure 1:
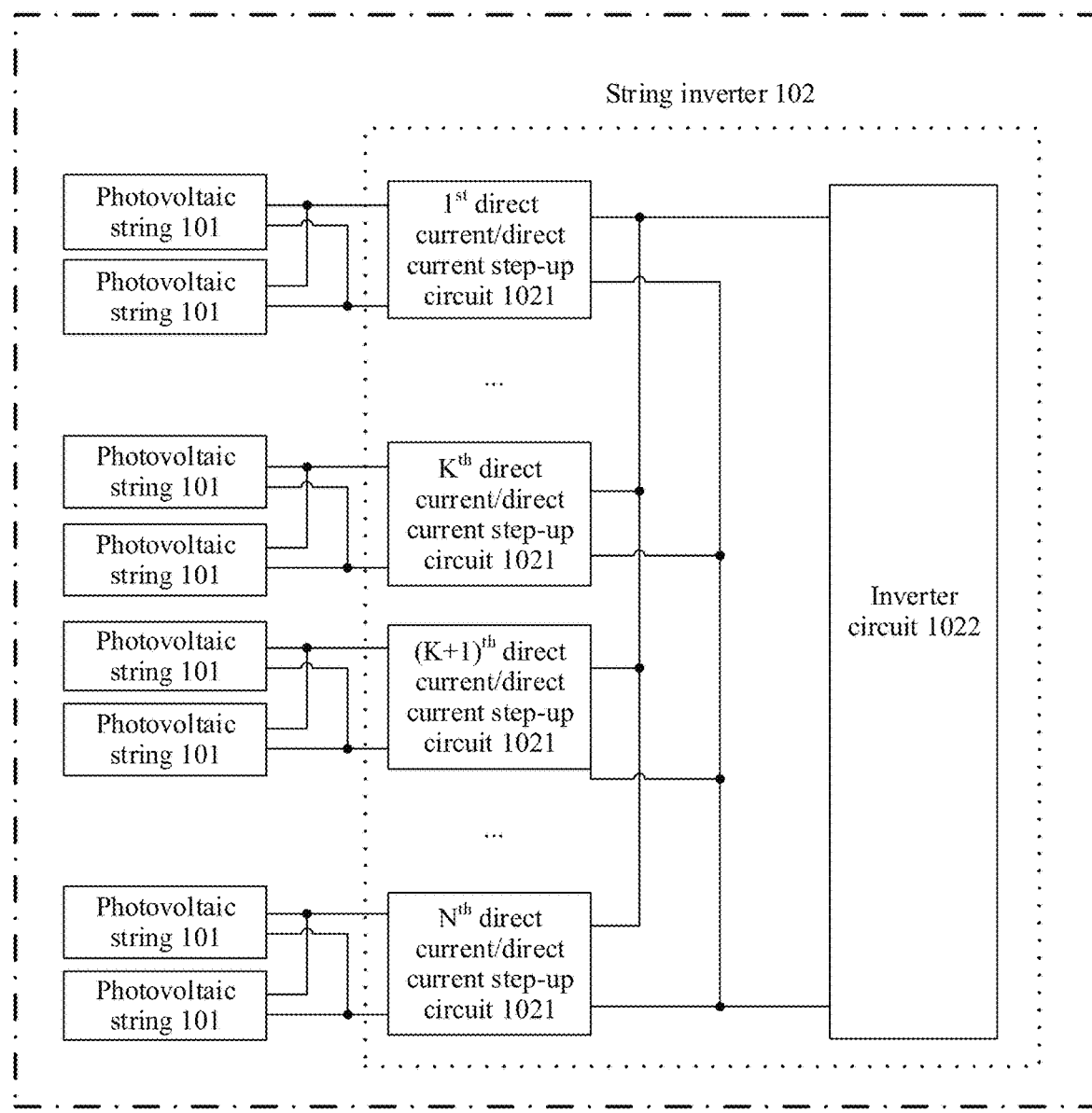
FIG. 1 is a schematic diagram of a photovoltaic power generation system according to an embodiment of this application.

It can be learned from the photovoltaic power generation systems shown in FIG. 3 and FIG. 4 that the online IV curve scanning technology based on a string inverter has significant advantages such as low additional costs, high operation and maintenance efficiency, and a low loss of an electric energy yield. Therefore, the online IV curve scanning technology based on the string inverter is an optimal technical solution for implementing IV curve scanning, and is also a mainstream IV curve scanning solution in the current photovoltaic industry. An IV curve obtaining method provided in the embodiments of this application is applied to the photovoltaic power generation system shown in FIG. 3. In addition, a circuit structure of components connected to each string inverter in the photovoltaic power generation system shown in FIG. 3 is shown in FIG. 1. Details are not described herein again.

In addition, with continuous development of the photovoltaic industry, to further reduce the costs of electric energy of the photovoltaic power generation system, a ratio of the dc capacity and ac capacity of the inverter in the photovoltaic power generation system becomes a mainstream trend in designing the photovoltaic power generation system in the industry. For the string inverter, a common manner of implementing a high capacity ratio in the industry is using a Y terminal to connect two photovoltaic strings in parallel, and then connecting the Y terminal to an input interface of a direct current/direct current step-up circuit of the string inverter. In this way, input power of the direct current/direct current step-up circuit multiplies, to increase the capacity ratio of the string inverter.

Figure 5:
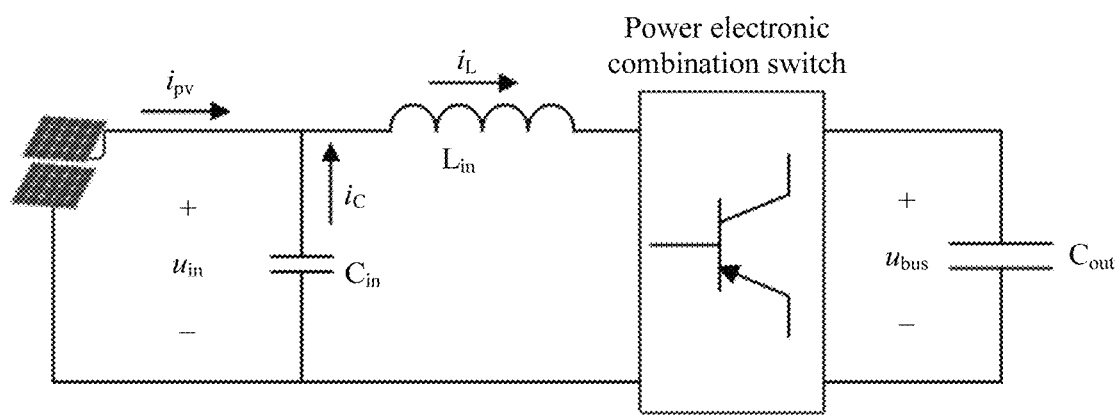
FIG. 5 is a schematic diagram of a direct current/direct current step-up circuit according to an embodiment of this application.

FIG. 5 is a schematic diagram of a direct current/direct current step-up circuit according to an embodiment of this application. As shown in FIG. 5, the direct current/direct current step-up circuit includes main elements such as an input capacitor $C_{in}$, an input inductor $L_{in}$, a power electronic combination switch, and an output capacitor $C_{out}$.

After the Y terminal is connected, because the photovoltaic strings connected to the Y terminal are connected in parallel, a short-circuit current of the direct current/direct current step-up circuit increases greatly. When the IV curve scanning is performed, it is required that IV curve scanning of a greater short-circuit current can be implemented on each direct current/direct current step-up circuit. During the IV curve scanning, near the short-circuit current, an input current $i_{pv}$ of the direct current/direct current step-up circuit is relatively large, and a ripple current $i_L$ of the input inductor $L_{in}$ of the direct current/direct current step-up circuit is also relatively large. In this case, overcurrent protection is easily triggered. Through increasing inductance of the input inductor $L_{in}$, the ripple current $i_L$ on the input inductor $L_{in}$ can be effectively reduced, to avoid triggering overcurrent protection. However, this significantly increases the costs. To resolve this problem, this application provides a string inverter control method, apparatus, and system, and a string inverter controller, to reduce the ripple current on the input inductor $L_{in}$ during the IV curve scanning without additionally increasing the costs of the input inductor $L_{in}$.

Figure 6:
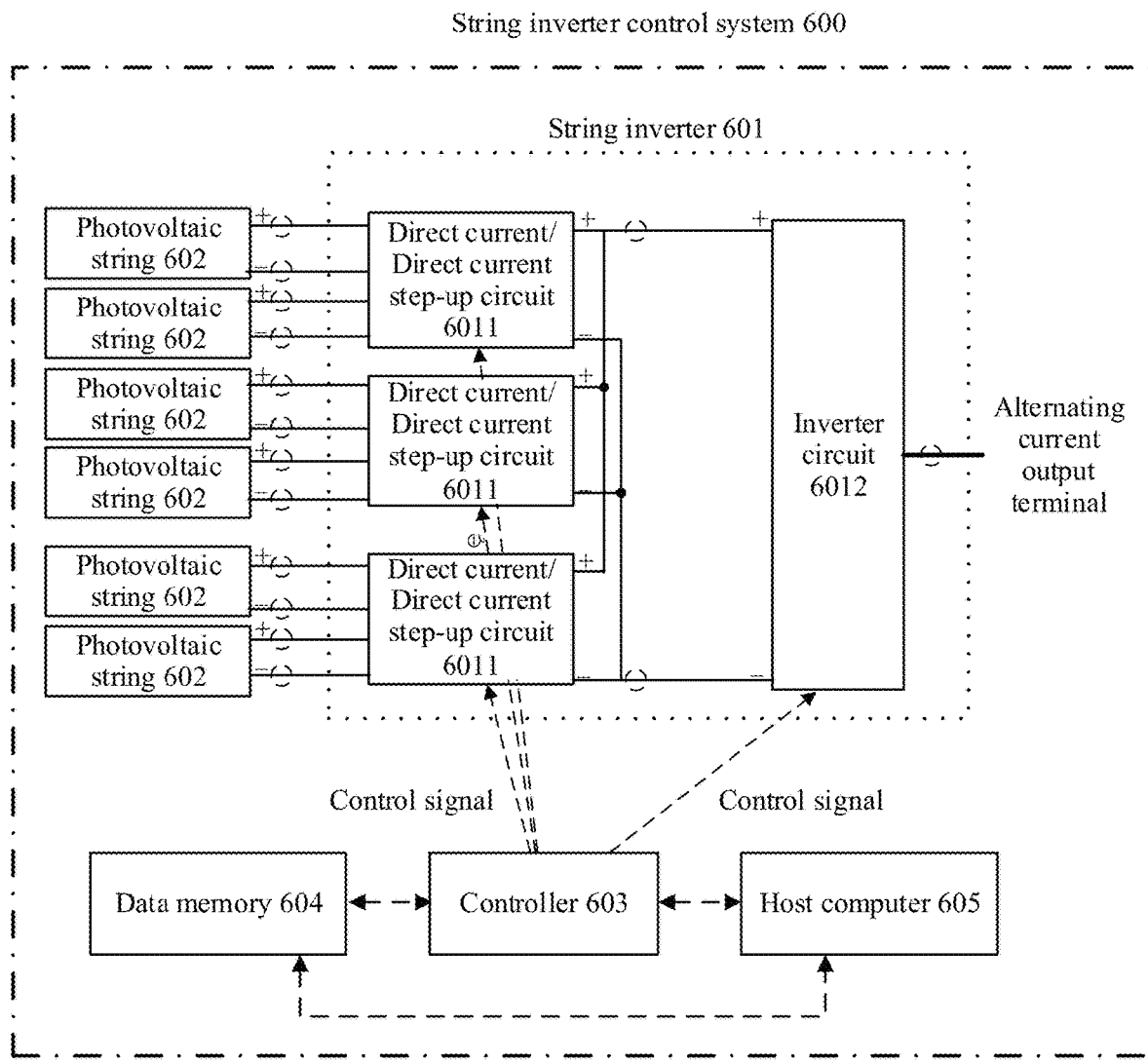
FIG. 6 is a schematic diagram of a string inverter control system according to an embodiment of this application.

FIG. 6 is a schematic diagram of a string inverter control system according to an embodiment of this application. As shown in FIG. 6, the system 600 includes a string inverter 601, a plurality of photovoltaic strings 602, a controller 603, a data memory 604, and a host computer 605. The string inverter 601 includes a plurality of direct current/direct current step-up circuits 6011 and an inverter circuit 6012. Output ends of the direct current/direct current step-up circuits 6011 are connected in parallel, and then connected to an input end of the inverter circuit 6012. An input end of each direct current/direct current step-up circuit 6011 is connected to two photovoltaic strings 602 by using a Y terminal.

As shown in FIG. 6, each direct current/direct current step-up circuit 6011 and the inverter circuit 6012 in the string inverter 601 are both connected to the controller 603. The host computer 605 is connected to both the controller 603 and the data memory 604. The controller 603 is further connected to the data memory 604. The host computer 605 is configured to send a scanning instruction to the controller 603, and the controller 603 is configured to: when receiving the scanning instruction, input a control signal to the direct current/direct current step-up circuits 6011 and the inverter circuit 6012, to implement the IV curve obtaining method provided in the embodiments of this application. The data memory 604 is configured to store data collected by the controller 603 from the direct current/direct current step-up circuits 6011 and the inverter circuit 6012. The host computer 605 is further configured to obtain data from the data memory 604, to draw an IV curve.

The processor 603 may be a microprocessor (microprocessor unit, MPU), an application-specific integrated circuit (application-specific integrated circuit, ASIC), or one or more integrated circuits configured to control program execution of the solutions in this application.

The data memory 604 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk or another magnetic storage device, or any other medium that can be used to carry or store expected program code in a form of an instruction or a data structure and that can be accessed by a computer. However, the memory is not limited thereto. The data memory 604 may exist independently, and is connected to the controller 603 by using the communications cable. The data memory 604 may also be integrated with the controller 603.

The data memory 604 is further configured to store program code for performing the solutions of this application. The controller 603 controls the execution. The controller 603 is configured to execute the program code stored in the data memory 604. The program code may include one or more software modules. The system provided in an embodiment of the application may obtain, by using the controller 603 and the one or more software modules in the program code in the data memory 604, data used to draw an IV curve, and draw the IV curve by using the host computer 605.

It should be noted that an example in which the system shown in FIG. 6 includes one string inverter is merely used for description. For another string inverter in the photovoltaic power generation system, an IV curve may be obtained by using the system shown in FIG. 6. Details are not described herein.

Figure 7:
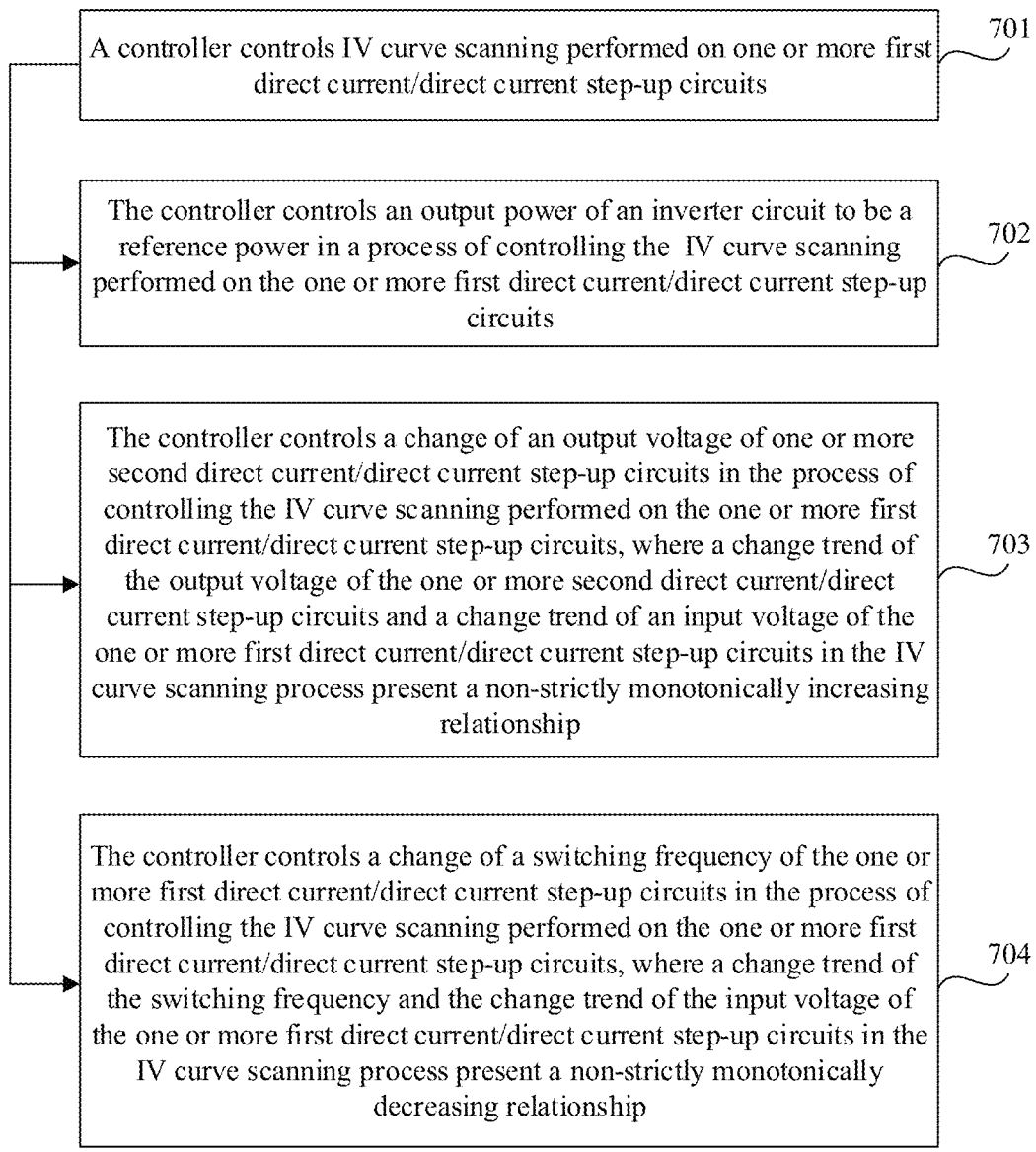
FIG. 7 is a flowchart of a string inverter control method according to an embodiment of this application.

FIG. 7 is a flowchart of a string inverter control method according to an embodiment of this application. As shown in FIG. 7, the method includes the following steps.

Step 701: A controller controls IV curve scanning performed on one or more first direct current/direct current step-up circuits.

In an embodiment of the application, for ease of subsequent description, in the string inverter, a direct current/direct current step-up circuit on which current-voltage IV curve scanning needs to be performed is referred to as the first direct current/direct current step-up circuit, and a direct current/direct current step-up circuit on which the IV curve scanning does not need to be performed is referred to as a second direct current/direct current step-up circuit.

As shown in FIG. 6, when the controller receives the scanning instruction sent by the host computer, in step 701, the controller may perform the IV curve scanning on the one or more first direct current/direct current step-up circuits included in the string inverter.

An embodiment of controlling the IV curve scanning performed on the one or more first direct current/direct current step-up circuits may be as follows: The controller controls an input voltage of each of the one or more first direct current/direct current step-up circuits to change from a reference open-circuit voltage to a reference short-circuit voltage, and obtains a status in which an input current of each of the one or more first direct current/direct current step-up circuits changes with an input voltage, to draw an IV curve of a photovoltaic string connected to each of the one or more first direct current/direct current step-up circuits.

In an embodiment, a process in which the input voltage of each first direct current/direct current step-up circuit changes from the reference open-circuit voltage to the reference short-circuit voltage may be divided into a plurality of moments. In this way, for any first direct current/direct current step-up circuit in the one or more first direct current/direct current step-up circuits, the controller may control an input voltage of the first direct current/direct current step-up circuit at each of the plurality of moments, to control the input voltage of the first direct current/direct current step-up circuit to change from the reference open-circuit voltage to the reference short-circuit voltage.

In this case, after controlling the input voltage of the first direct current/direct current step-up circuit at each moment, the controller may collect the input current of the first direct current/direct current step-up circuit, to obtain the status in which the input current of the first direct current/direct current step-up circuit changes with the input voltage.

In addition, as shown in FIG. 6, after collecting the input current of the first direct current/direct current step-up circuit at each of the plurality of moments, the controller may store, in the data memory, the input voltage at each moment and the input current collected at each moment. In this way, the host computer may draw, based on the input voltage at each moment and the input current at each moment that are stored in the data memory, the IV curve of the photovoltaic string connected to the first direct current/direct current step-up circuit.

In an embodiment of the application, in the IV curve obtaining process, the controller may scan one of the direct current/direct current step-up circuits included in the string inverter, or may scan a batch of direct current/direct current step-up circuits at the same time. For example, the string inverter includes 20 direct current/direct current step-up circuits. The controller may select to first scan a $1^{st}$ to an $8^{th}$ direct current/direct current step-up circuits. After completing the scanning performed on the $1^{st}$ to the $8^{th}$ direct current/direct current step-up circuits, the controller selects to continue to scan a $9t^h$ to a $16^{th}$ direct current/direct current step-up circuits. After completing the scanning performed on the $9^{th}$ to the $16^{th}$ direct current/direct current step-up circuits, the controller selects to continue to scan a $17^{th}$ to a $20^{th}$ direct current/direct current step-up circuits, to complete a scanning work of all the direct current/direct current step-up circuits include in the string inverter.

Because the photovoltaic strings connected to the first direct current/direct current step-up circuits may include different photovoltaic modules, the photovoltaic strings connected to the first direct current/direct current step-up circuits may have different open-circuit voltages. Therefore, in the IV curve scanning process of the controller, the first direct current/direct current step-up circuits may have different reference open-circuit voltages. The reference open-circuit voltage for each first direct current/direct current step-up circuit may be preconfigured. For example, before scanning each first direct current/direct current step-up circuit, the controller first obtains an open-circuit voltage of each first direct current/direct current step-up circuit by using a voltage tester. The open-circuit voltage of each first direct current/direct current step-up circuit may be directly used as the reference open-circuit voltage of the first direct current/direct current step-up circuit. Alternatively, the controller may select a voltage from a range of the open-circuit voltage of the first direct current/direct current step-up circuit as the reference open-circuit voltage of the first direct current/direct current step-up circuit. This is not limited in an embodiment of the application.

In addition, the reference open-circuit voltages of the first direct current/direct current step-up circuits may be the same. For example, the reference open-circuit voltages are all set to a voltage value close to 0 V.

The batch of direct current/direct current step-up circuits are currently scanned at the same time, that is, the IV curve scanning needs to be currently performed on the plurality of first direct current/direct current step-up circuits. In this case, because the first direct current/direct current step-up circuits may have different reference open-circuit voltages, and the first direct current/direct current step-up circuits have the same reference short-circuit voltage, in this scenario, for ease of controlling the inverter circuit and the second direct current/direct current step-up circuits in the scanning process, the same scanning time is required for controlling the input voltage of each of the plurality of first direct current/direct current step-up circuits to change from the reference open-circuit voltage to the reference short-circuit voltage.

In an embodiment, a scanning frequency for each first direct current/direct current step-up circuit may be determined based on the preset scanning time and the reference open-circuit voltage and the reference short-circuit voltage of each first direct current/direct current step-up circuit. In this way, when the controller scans the input voltage of each first direct current/direct current step-up circuit based on the determined scanning frequency, the same scanning time may be taken for changing the input voltage of each of the plurality of first direct current/direct current step-up circuits from the reference open-circuit voltage to the reference short-circuit voltage.

For example, input voltages of a $1^{st}$ to a $3^{rd}$ direct current/direct current step-up circuits need to be scanned currently. It is assumed that reference open-circuit voltages of the $1^{st}$ to the $3^{rd}$ direct current/direct current step-up circuits are respectively 100 V, 90 V, and 80 V, and reference short-circuit voltages of the first to the third direct current/direct current step-up circuits are all 0 V. In this case, a scanning frequency of the $1^{st}$ direct current/direct current step-up circuit may be set to 10 V/s, a scanning frequency of the $2^{nd}$ direct current/direct current step-up circuit may be set to 9 V/s, and a scanning frequency of the $3^{rd}$ direct current/direct current step-up circuit may be set to 8 V/s. When the $1^{st}$ to the $3^{rd}$ direct current/direct current step-up circuits are scanned respectively based on the three specified scanning frequencies, an IV curve scanning work may be completed for the three direct current/direct current step-up circuits within 10 seconds.

Step 702: The controller controls output power of the inverter circuit to be reference power in a process of controlling the IV curve scanning performed on the one or more first direct current/direct current step-up circuits.

In an embodiment of the application, to avoid unstable power supply from a photovoltaic power generation system to a power grid in the IV curve obtaining process, the controller may control the output power of the inverter circuit to be the reference power in a process of controlling the IV curve scanning performed on the one or more first direct current/direct current step-up circuits.

It should be noted that an embodiment of the application does not limit an embodiment of controlling the output power of the inverter circuit to be the reference power. Any manner of controlling the output power of the inverter circuit may be applied to an embodiment of the application. For example, the output power of the inverter circuit may be controlled through controlling a d-axis current in the inverter circuit.

In addition, the reference power in step 702 is preconfigured. In an embodiment, a process of configuring the reference power may be as follows: obtaining maximum input power of each direct current/direct current step-up circuit included in the string inverter; determining a sum of maximum input power of all of the direct current/direct current step-up circuits included in the string inverter; multiplying the determined sum value by a power loss coefficient to obtain theoretical output power; and determining the reference power based on the theoretical output power, where a difference between the reference power and the theoretical output power is less than a power threshold.

The power threshold may be determined based on rated power of the string inverter. For example, the reference power in step 702 may be represented by using the following formula:

$$|p_{ref(t)} - \Sigma p_{j(t0)} \cdot \alpha| \leq p_{norm} \cdot \varepsilon.$$

$p_{ref(t)}$ is used to indicate the reference power, $\Sigma p_{j(t0)}$ is used to indicate the sum of the maximum input power of all of the direct current/direct current step-up circuits included in the string inverter, $\alpha$ is a value greater than 0 and less than or equal to 1, $p_{norm}$ is the rated power of the string inverter, and $\varepsilon$ is a preset percentage, and may be a percentage less than or equal to 15%.

For example, $\varepsilon$ is 0, to indicate that the reference power is consistent with the theoretical output power. In this case, the reference power may further be determined by using the following formula:

$$p_{ref(t)} = \sum p_{j(t0)} \cdot \frac{N-K}{N}.$$

N is a total quantity of direct current/direct current step-up circuits included in the string inverter, and K is a quantity of direct current/direct current step-up circuits on which the IV curve scanning needs to be performed, that is, a quantity of the one or more first direct current/direct current step-up circuits in step 701. In this case, a proportion of the direct current/direct current step-up circuit on which the IV scanning needs to be performed, to the direct current/direct current step-up circuits included in the string inverter is $\alpha$.

Step 703: The controller controls a change of an output voltage of the one or more second direct current/direct current step-up circuits in the process of controlling the IV curve scanning performed on the one or more first direct current/direct current step-up circuits, where a change trend of the output voltage of the one or more second direct current/direct current step-up circuits and a change trend of an input voltage of the one or more first direct current/direct current step-up circuits in the IV curve scanning process present a non-strictly monotonically increasing relationship.

The non-strictly monotonically increasing relationship indicates that: if y and x present the non-strictly monotonically increasing relationship, y increases or remains unchanged when x increases, and y decreases or remains unchanged when x decreases.

It should be noted that, because output ends of the direct current/direct current step-up circuits included in the string inverter are connected in parallel, and the output ends of the direct current/direct current step-up circuits are connected in parallel and then connected to an input end of the inverter circuit, after the change of the output voltage of the one or more second direct current/direct current step-up circuits included in the string inverter is controlled, the output voltage of the one or more first direct current/direct current step-up circuits also changes correspondingly, which is equivalent to controlling a dynamic change of a bus voltage at the input end of the inverter circuit.

In the process of performing the IV curve scanning on the one or more first direct current/direct current step-up circuits, an output voltage of a direct current/direct current step-up circuit is usually higher than an input voltage of the direct current/direct current step-up circuit. Therefore, in the process of performing the IV curve scanning on the one or more first direct current/direct current step-up circuits, if the bus voltage at the input end of the inverter circuit is controlled to be fixed, the bus voltage at the input end of the inverter circuit needs to be greater than the reference open-circuit voltages of these first direct current/direct current step-up circuits. In this case, in the process of performing the IV curve scanning on these direct current/direct current step-up circuits, the bus voltage at the input end of the inverter circuit is always in a relatively high state. Therefore, when scanning is performed near the reference short-circuit voltage in the process of performing the IV curve scanning on these first direct current/direct current step-up circuits, a voltage difference between two ends of each first direct current/direct current step-up circuit is relatively large, and positive correlation exists between a ripple current on an input inductor in each first direct current/direct current step-up circuit and a voltage difference between two ends of the input inductor. In this case, the ripple current on the input inductor in each first direct current/direct current step-up circuit is relatively large, and overcurrent protection of the input inductor is easily triggered.

Therefore, in an embodiment of the application, in the process of controlling the IV curve scanning performed on the one or more first direct current/direct current step-up circuits, the change of the output voltage of the one or more second direct current/direct current step-up circuits is controlled. In the IV curve scanning process, the input voltages of these first direct current/direct current step-up circuits tend to be lower. If the change trend of the output voltage of the one or more second direct current/direct current step-up circuits and the change trend of the input voltage of the one or more first direct current/direct current step-up circuits present the non-strictly monotonically increasing relationship, the bus voltage at the input end of the inverter circuit also tends to be lower and does not need to be always in the relatively high state, to reduce the ripple current on the input inductor in the first direct current/direct current step-up circuit, thereby avoiding triggering overcurrent protection of the input inductor.

In an embodiment, a process of step 703 may be: in the process of controlling the IV curve scanning performed on the one or more first direct current/direct current step-up circuits, for any second direct current/direct current step-up circuit in the one or more second direct current/direct current step-up circuits, adjusting an actual value of an output voltage of the second direct current/direct current step-up circuit at each moment based on a reference value of the output voltage of the second direct current/direct current step-up circuit at the same moment, until an absolute value of a difference between the actual value of the output voltage of the second direct current/direct current step-up circuit at each moment and the reference value of the output voltage at the same moment is less than a difference threshold.

Herein, a change trend of reference values of output voltages of the second direct current/direct current step-up circuit at all moments in the IV curve scanning process and a change trend of input voltages of the one or more first direct current/direct current step-up circuits at all the moment in the IV curve scanning process present anon-strictly monotonically increasing relationship.

The difference threshold is a preset value, and the difference threshold is any value less than 3% of a reference bus voltage.

An embodiment of adjusting the actual value of the output voltage of the second direct current/direct current step-up circuit at each moment based on the reference value of the output voltage of the second direct current/direct current step-up circuit at the same moment may be: for any moment in the IV curve scanning process, if a difference between the reference value of the output voltage at the moment and the actual value of the output voltage of the second direct current/direct current step-up circuit at the moment is greater than the reference threshold, increasing power extracted by the second direct current/direct current step-up circuit from a connected photovoltaic string; or if a difference between the reference value of the output voltage at the moment and the actual value of the output voltage of the second direct current/direct current step-up circuit at the moment is greater than the reference threshold, reducing power extracted by the second direct current/direct current step-up circuit from a connected photovoltaic string.

In other words, for the direct current/direct current step-up circuit on which the scanning is not performed, the output voltage of the direct current/direct current step-up circuit may be controlled through controlling the power extracted by the direct current/direct current step-up circuit from the connected photovoltaic string. It is equivalent to controlling the dynamic change of the bus voltage at the input end of the inverter circuit through controlling the power extracted by the direct current/direct current step-up circuit from the connected photovoltaic string.

In addition, for any second direct current/direct current step-up circuit in the one or more second direct current/direct current step-up circuits included in the string inverter, the reference value of the output voltage of the second direct current/direct current step-up circuit at each of the plurality of moments is preconfigured. In an embodiment, a process of setting the reference value of the output voltage for the output voltage of the second direct current/direct current step-up circuit at each of the plurality of moments may be: before the IV curve scanning performed on the one or more first direct current/direct current step-up circuits included in the string inverter is controlled, obtaining voltage values that need to be met by the one or more first direct current/direct current step-up circuits at a plurality of moments in the IV curve scanning process; and for any first moment and any second moment in the plurality of moments, if a voltage value that is of the input voltage of the one or more first direct current/direct current step-up circuits and that needs to be met at the first moment is greater than a voltage value that needs to be met at the second moment, setting a reference value of the output voltage of the second direct current/direct current step-up circuit at the first moment to be greater than or equal to a reference value of the output voltage at the second moment.

For example, voltage values that need to be met by the input voltage of each of the one or more first direct current/direct current step-up circuits at the plurality of moments are shown in Table 1. In the entire scanning process, four moments are determined, and are respectively marked as a first moment, a second moment, a third moment, and a fourth moment. For the input voltage of each of the one or more first direct current/direct current step-up circuits, a voltage value that needs to be met at the first moment is Ul (t1), a voltage value that needs to be met at the second moment is 0.5 Ul (t1), a voltage value that needs to be met at the third moment is 0.4 Ul (t1), and a voltage value that needs to be met at the fourth moment is 0. In this case, the reference value of the output voltage shown in Table 1 may be set for each of the second direct current/direct current step-up circuits on which the scanning does not need to be performed.

As shown in Table 1, at the first moment, the reference value of the output voltage of each of the second direct current/direct current step-up circuits on which the IV curve scanning does not need to be performed is Umax(t1). At the second moment, the reference value of the output voltage of each of the second direct current/direct current step-up circuits on which the IV curve scanning does not need to be performed is Umax(t1). At the third moment, the reference value of the output voltage of each of the second direct current/direct current step-up circuits on which the IV curve scanning does not need to be performed is 0.75 Umax(t1). At the fourth moment, the reference value of the output voltage of each of the second direct current/direct current step-up circuits on which the IV curve scanning does not need to be performed is 0.75 Umax(t1). It is clear that, in the scanning process, as the input voltage of the first direct current/direct current step-up circuit on which the IV curve scanning is performed decreases, the reference value of the output voltage of each of the second direct current/direct current step-up circuits on which the IV curve scanning does not need to be performed decreases or remains unchanged. In other words, the change trend of the reference values of the output voltages at all of the plurality of moments and the change trend of the input voltages of all of the one or more first direct current/direct current step-up circuits at the plurality of moments present a non-strictly monotonically increasing relationship.

TABLE 1

| Moments | Input voltage | Reference value of an output voltage |
| --- | --- | --- |
| First moment | Ul (t1) | Umax(t1) |
| Second moment | 0.5 Ul (t1) | Umax(t1) |
| Third moment | 0.4 Ul (t1) | 0.75 Umax(t1) |
| Fourth moment | 0 | 0.75 Umax(t1) |

In Table 1, Ul (t1) may be the reference open-circuit voltage of each of the one or more first direct current/direct current step-up circuits. Herein, Umax(t1) may be any value greater than Ul (t1). When the control method provided in an embodiment of the application is used, a value of Umax(t1) is the smaller the better. Therefore, the value of Umax(t1) may be set according to a requirement.

In addition, to ensure normal operation of the string inverter, the value of Umax(t1) cannot exceed a withstand voltage of the bus voltage at the input end of the inverter circuit. In addition, a minimum value of the reference output voltage cannot be set excessively small, and needs to be greater than an amplitude of a line voltage of the power grid connected to the photovoltaic power generation system.

In addition, in an embodiment of the application, to further reduce the ripple current on the input inductor in the first direct current/direct current step-up circuit in the scanning process, the following step 704 may further be used to control a dynamic change of a switching frequency of each of the one or more first direct current/direct current step-up circuits.

Step 704: The controller controls the change of the switching frequency of the one or more first direct current/direct current step-up circuits in the process of controlling the IV curve scanning performed on the one or more first direct current/direct current step-up circuits, where a change trend of the switching frequency and the change trend of the input voltage of the one or more first direct current/direct current step-up circuits in the IV curve scanning process present a non-strictly monotonically decreasing relationship.

An embodiment of controlling the dynamic change of the switching frequency of the one or more first direct current/direct current step-up circuits may be: for any first direct current/direct current step-up circuit in the one or more first direct current/direct current step-up circuits, at any moment in the plurality of moments in the IV curve scanning process, if an input voltage of the first direct current/direct current step-up circuit at the moment is less than an input voltage of the first direct current/direct current step-up circuit at a previous moment, adjusting a switching frequency of the first direct current/direct current step-up circuit at the moment to be greater than or equal to a switching frequency of the first direct current/direct current step-up circuit at the previous moment; or if an input voltage of the first direct current/direct current step-up circuit at the moment is greater than an input voltage of the first direct current/direct current step-up circuit at a previous moment, adjusting a switching frequency of the first direct current/direct current step-up circuit at the moment to be less than or equal to a switching frequency of the first direct current/direct current step-up circuit at the previous moment.

For example, for any moment, a value of the adjusted switching frequency at the moment may be determined by using the following formula:

$$F1(t)=F0(t1)[1+0.5(t-t1)/(t2-t1)].$$

F1(t) is used to indicate the value of the adjusted switching frequency at the moment, F0(t1) is used to indicate a switching frequency of the direct current/direct current step-up circuit when the scanning is not performed, t is used to indicate a current moment, t1 is used to indicate a start moment of the scanning, and t2 is used to indicate an end moment of the scanning.

The switching frequency of the first direct current/direct current step-up circuit is adjusted by using the foregoing formula. In a process of scanning the input voltage of the first direct current/direct current step-up circuit, the switching frequency of the first direct current/direct current step-up circuit increases as the input voltage decreases, to reduce the ripple current on the first direct current/direct current step-up circuit.

It should be noted that, in the IV curve scanning process, the ripple current on the first direct current/direct current step-up circuit may be reduced by separately using step 702 and step 703. Alternatively, the ripple current of the first direct current/direct current step-up circuit may be reduced by separately using step 702 and step 704. In an embodiment, the ripple current of the first direct current/direct current step-up circuit may be reduced by jointly using step 702 to step 704. This is not limited in an embodiment of the application.

In an embodiment of the application, in the IV curve scanning process, the dynamic change of the output voltage of the one or more second direct current/direct current step-up circuits on which the IV curve scanning does not need to be performed and that are included in the string inverter is controlled. Because the output voltage of the one or more second direct current/direct current step-up circuits is also the bus voltage at the input end of the inverter circuit, in an embodiment of the application, in the IV curve scanning process, the bus voltage at the input end of the inverter circuit dynamically changes, and the change trend of the dynamic change and the change trend of the input voltage of the one or more first direct current/direct current step-up circuits on which the IV curve scanning needs to be performed in the IV curve scanning process present the non-strictly monotonically increasing relationship. In this case, for the first direct current/direct current step-up circuit on which the IV curve scanning is performed, a voltage difference between two ends of the first direct current/direct current step-up circuit is not always in a relatively high state, so that the ripple current on the input inductor in the first direct current/direct current step-up circuit can be reduced. In this way, the following case can be avoided: Overcurrent protection is triggered on the first direct current/direct current step-up circuit due to the excessively large ripple current on the input inductor. Normal operation of the string inverter is ensured in the IV curve scanning process.

Figure 8:
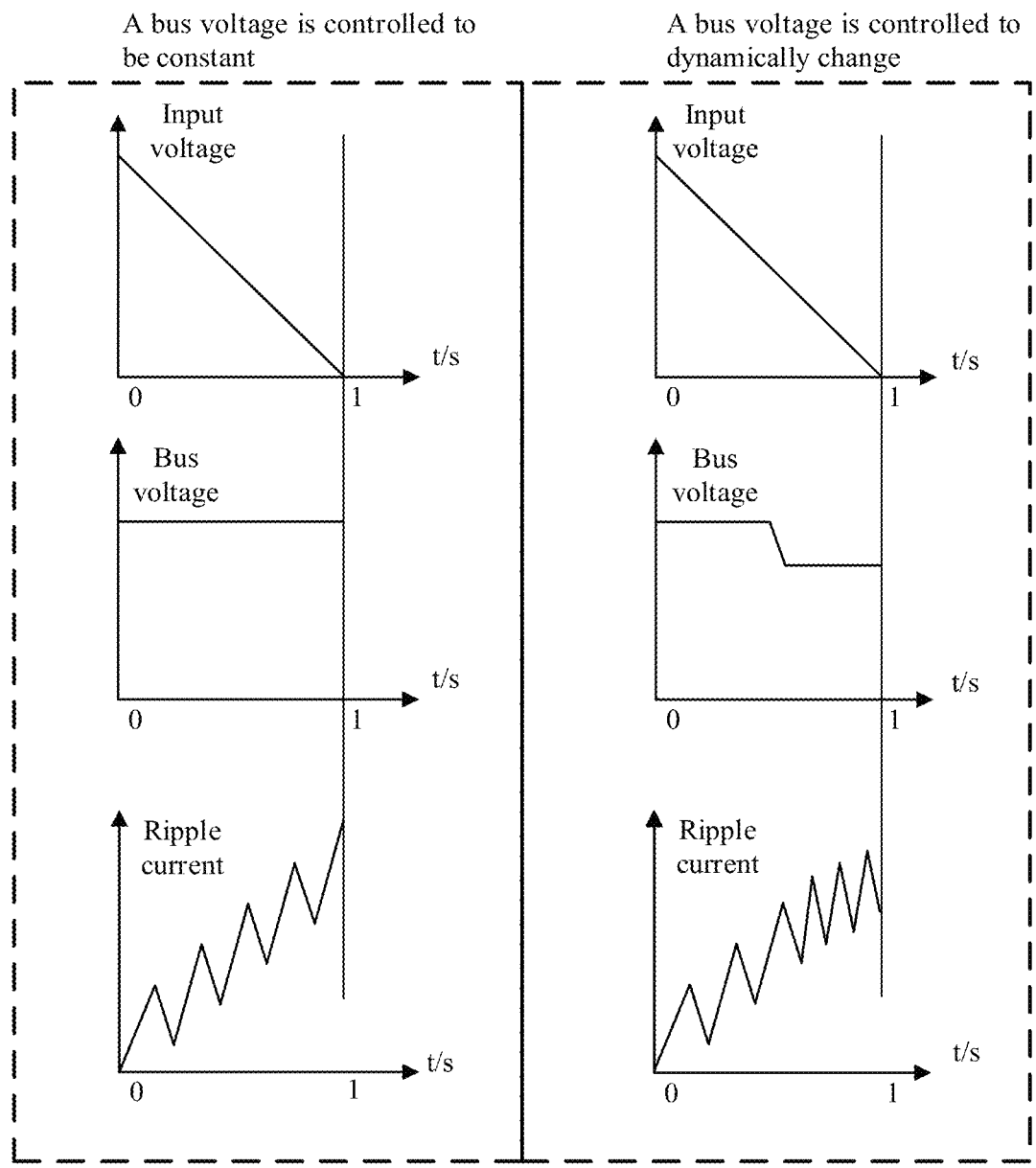
FIG. 8 is a schematic diagram of a verification result according to an embodiment of this application.

To further describe a technical effect of the string inverter control method provided in an embodiment of the application, the control method provided in an embodiment of the application is verified. FIG. 8 is a schematic diagram of a verification result according to an embodiment of this application. The IV curve scanning is separately performed on two direct current/direct current step-up circuits. In the IV curve scanning process, for one of the two direct current/direct current step-up circuits, a bus voltage is controlled to be constant, and a ripple current on an input inductor in the direct current/direct current step-up circuit is detected. An experimental result is shown on a left side of FIG. 8. In the IV curve scanning process, for the other one of the two direct current/direct current step-up circuits, a bus voltage is controlled to dynamically change in the manner provided in the embodiments of this application, and a ripple current on an input inductor in the direct current/direct current step-up circuit is detected. An experimental result is shown on a right side of FIG. 8. The two experimental results may indicate that, in the IV curve scanning process, when the bus voltage is controlled to dynamically change in the manner provided in the embodiments of this application, the ripple current on the input inductor in the direct current/direct current step-up circuit may be significantly reduced, to avoid triggering overcurrent protection. The bus voltage in FIG. 8 is the bus voltage at the input end of the inverter circuit in the foregoing embodiments.

Figure 9:
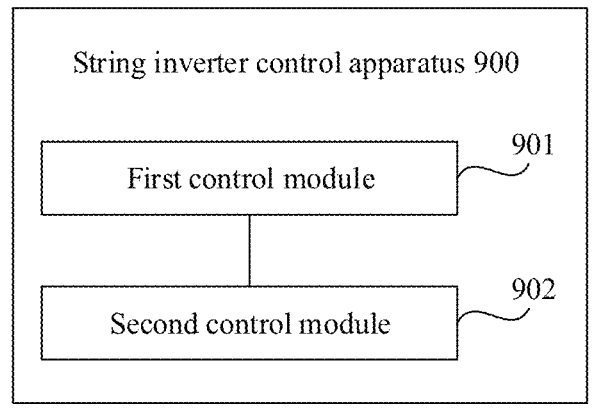
FIG. 9 is a schematic diagram of a string inverter control apparatus according to an embodiment of this application.

FIG. 9 is a schematic diagram of a string inverter control apparatus according to an embodiment of this application. A string inverter includes one or more first direct current/direct current step-up circuits, one or more second direct current/direct current step-up circuits, and an inverter circuit. The one or more first direct current/direct current step-up circuits are direct current/direct current step-up circuits on which current-voltage IV curve scanning is performed. The one or more second direct current/direct current step-up circuits are direct current/direct current step-up circuits on which the IV curve scanning is not performed. As shown in FIG. 9, the apparatus 900 includes:

a first control module 901, configured to perform step 702 in the embodiment shown in FIG. 7; and a second control module 902, configured to perform step 703 in the embodiment shown in FIG. 7.

In an embodiment, the second control module 902 includes:

an adjustment unit, configured to: in the process of controlling the IV curve scanning performed on the one or more first direct current/direct current step-up circuits, for any second direct current/direct current step-up circuit in the one or more second direct current/direct current step-up circuits, adjust an actual value of an output voltage of the second direct current/direct current step-up circuit at each moment based on a reference value of the output voltage of the second direct current/direct current step-up circuit at the same moment, until an absolute value of a difference between the actual value of the output voltage of the second direct current/direct current step-up circuit at each moment and the reference value of the output voltage at the same moment is less than a difference threshold.

A change trend of reference values of output voltages of the second direct current/direct current step-up circuit at all moments in the IV curve scanning process and a change trend of input voltages of the one or more first direct current/direct current step-up circuits at all the moments in the IV curve scanning process present a non-strictly monotonically increasing relationship.

In an embodiment, the adjustment unit is configured to:

for any moment in the IV curve scanning process, if a difference between the reference value of the output voltage at the moment and the actual value of the output voltage of the second direct current/direct current step-up circuit at the moment is greater than the reference threshold, increase power extracted by the second direct current/direct current step-up circuit from a connected photovoltaic string; or if a difference between the reference value of the output voltage at the moment and the actual value of the output voltage of the second direct current/direct current step-up circuit at the moment is greater than a reference threshold, reduce power extracted by the second direct current/direct current step-up circuit from a connected photovoltaic string.

Figure 10:
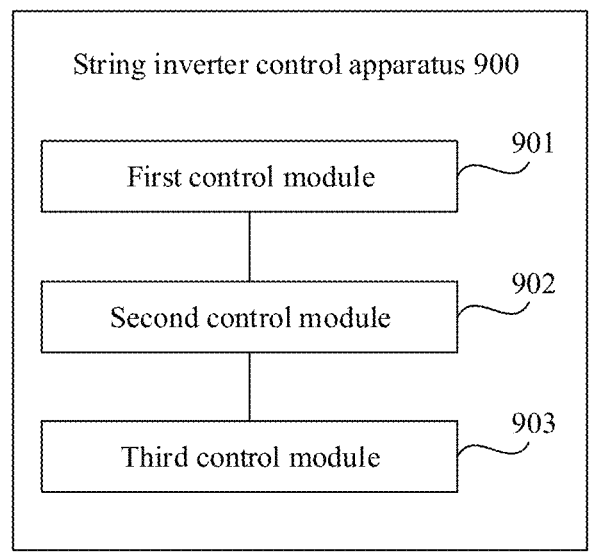
FIG. 10 is a schematic diagram of another string inverter control apparatus according to an embodiment of this application.

In an embodiment, as shown in FIG. 10, the apparatus 900 further includes:

a third control module 903, configured to perform step 704 in the embodiment shown in FIG. 7.

In an embodiment, the third control module 903 is configured to:

for any first direct current/direct current step-up circuit in the one or more first direct current/direct current step-up circuits, at any moment in a plurality of moments in the IV curve scanning process, if an input voltage of the first direct current/direct current step-up circuit at the moment is less than an input voltage of the first direct current/direct current step-up circuit at a previous moment, adjust a switching frequency of the first direct current/direct current step-up circuit at the moment to be greater than or equal to a switching frequency of the first direct current/direct current step-up circuit at the previous moment; or if an input voltage of the first direct current/direct current step-up circuit at the moment is greater than an input voltage of the first direct current/direct current step-up circuit at a previous moment, adjust a switching frequency of the first direct current/direct current step-up circuit at the moment to be less than or equal to a switching frequency of the first direct current/direct current step-up circuit at the previous moment.

In an embodiment, the apparatus 900 further includes:

an obtaining module, configured to: before the IV curve scanning performed on the one or more first direct current/direct current step-up circuits is controlled, obtain maximum input power of each direct current/direct current step-up circuit included in the string inverter;

a first determining module, configured to determine a sum of maximum input power of all of the direct current/direct current step-up circuits included in the string inverter;

a second determining module, configured to multiply the determined sum value by a power loss coefficient to obtain theoretical output power; and a third determining module, configured to determine the reference power based on the theoretical output power, where a difference between the reference power and the theoretical output power is less than a power threshold.

In an embodiment of the application, in the IV curve scanning process, the dynamic change of the output voltage of the one or more second direct current/direct current step-up circuits on which the IV curve scanning does not need to be performed and that are included in the string inverter is controlled. Because the output voltage of the one or more second direct current/direct current step-up circuits is also a bus voltage at an input end of the inverter circuit, in an embodiment of the application, in the IV curve scanning process, the bus voltage at the input end of the inverter circuit dynamically changes, and the change trend of the dynamic change and the change trend of the input voltage of the one or more first direct current/direct current step-up circuits on which the IV curve scanning needs to be performed in the IV curve scanning process present the non-strictly monotonically increasing relationship. In this case, for the first direct current/direct current step-up circuit on which the IV curve scanning is performed, a voltage difference between two ends of the first direct current/direct current step-up circuit is not always in a relatively high state, so that a ripple current on an input inductor in the first direct current/direct current step-up circuit can be reduced. In this way, the following case can be avoided: Overcurrent protection is triggered on the first direct current/direct current step-up circuit due to the excessively large ripple current on the input inductor. Normal operation of the string inverter is ensured in the IV curve scanning process.

It should be noted that when the string inverter control apparatus provided in the foregoing embodiments performs IV curve scanning, division into the foregoing functional modules is used as an example only for description. In an actual application, the foregoing functions may be allocated to different functional modules for implementation based on needs. In other words, an inner structure of a device may be divided into different functional modules, to implement all or some functions described above. In addition, the string inverter control apparatus provided in the foregoing embodiment pertains to the same concept as the embodiment of the string inverter control method. For an implementation process, refer to the method embodiments. Details are not described herein.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

One of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the principle of this application should fall within the protection scope of this application.

The invention claimed is:

1. A string inverter control method, comprising:
in a process of performing current-voltage (IV) curve scanning on one or more first direct current/direct current (DC/DC) step-up circuits, controlling output power of an inverter circuit to be reference power, wherein a string inverter comprises the one or more first DC/DC step-up circuits, one or more second DC/DC step-up circuits, and the inverter circuit, wherein the one or more first DC/DC step-up circuits are DC/DC step-up circuits on which the IV curve scanning is performed, and wherein the one or more DC/DC step-up circuits are DC/DC step-up circuits on which the IV curve scanning is not performed, and
controlling a change of an output voltage of the one or more second DC/DC step-up circuits, wherein a change trend of the output voltage of the one or more second DC/DC step-up circuits and a change trend of an input voltage of the one or more first DC/DC step-up circuits in the IV curve scanning process present a non-strictly monotonically increasing relationship.

2. The method according to claim 1, wherein the controlling the change of the output voltage of the one or more second DC/DC step-up circuits comprises:
for any second DC/DC step-up circuit in the one or more second DC/DC step-up circuits, adjusting an actual value of an output voltage of the second DC/DC step-up circuit at each moment based on a reference value of the output voltage at the same moment, until an absolute value of a difference between the actual value of the output voltage of the second DC/DC step-up circuit at each moment and the reference value of the output voltage at the same moment is less than a difference threshold, wherein a change trend of reference values of output voltages of the second DC/DC step-up circuit at all moments in the IV curve scanning process and a change trend of input voltages of the one or more first DC/DC step-up circuits at all the moments in the IV curve scanning process present a non-strictly monotonically increasing relationship.

3. The method according to claim 2, wherein the adjusting the actual value of the output voltage of the second DC/DC step-up circuit at each moment based on the reference value of the output voltage of the second DC/DC step-up circuit at the same moment comprises:

for any moment in the IV curve scanning process, if a difference between the reference value of the output voltage at the moment and the actual value of the output voltage of the second DC/DC step-up circuit at the moment is greater than a reference threshold, increasing power extracted by the second DC/DC step-up circuit from a connected photovoltaic string; or if a difference between the reference value of the output voltage at the moment and the actual value of the output voltage of the second DC/DC step-up circuit at the moment is greater than the reference threshold, reducing power extracted by the second DC/DC step-up circuit from a connected photovoltaic string.

4. The method according to claim 1, further comprising: controlling a change of a switching frequency of the one or more first DC/DC step-up circuits, wherein the change trend of the switching frequency and the change trend of the input voltage of the one or more first DC/DC step-up circuits in the IV curve scanning process present a non-strictly monotonically decreasing relationship.

5. The method according to claim 4, wherein the controlling the change of the switching frequency of the one or more first DC/DC step-up circuits comprises:

for any first DC/DC step-up circuit in the one or more first DC/DC step-up circuits, at any moment in a plurality of moments in the IV curve scanning process, if an input voltage of the first DC/DC step-up circuit at the moment is less than an input voltage of the first DC/DC step-up circuit at a previous moment, adjusting a switching frequency of the first DC/DC step-up circuit at the moment to be greater than or equal to a switching frequency of the first DC/DC step-up circuit at the previous moment; or if an input voltage of the first DC/DC step-up circuit at the moment is greater than an input voltage of the first DC/DC step-up circuit at a previous moment, adjusting a switching frequency of the first DC/DC step-up circuit at the moment to be less than or equal to a switching frequency of the first DC/DC step-up circuit at the previous moment.

6. The method according to claim 1, further comprising: before the IV curve scanning is performed on the one or more first DC/DC step-up circuits, obtaining maximum input power of each DC/DC step-up circuit comprised in the string inverter;

if a sum of maximum input power of all of the DC/DC step-up circuits comprised in the string inverter, multiplying the sum by a power loss coefficient to obtain theoretical output power; and obtaining the reference power based on the theoretical output power, wherein a difference between the reference power and the theoretical output power is less than a power threshold.

7. A string inverter control apparatus, comprising:

a first control module, configured to: in a process of performing current-voltage (IV) curve scanning on one or more first direct current/direct current (DC/DC) step-up circuits, control output power of an inverter circuit to be reference power, wherein a string inverter comprises the one or more first DC/DC step-up circuits, one or more second DC/DC step-up circuits, and the inverter circuit, the one or more first DC/DC step-up circuits are DC/DC step-up circuits on which current-voltage IV curve scanning is performed, the one or more second DC/DC step-up circuits are DC/DC step-up circuits on which the IV curve scanning is not performed; and a second control module, configured to: in the process of performing the IV curve scanning on the one or more first DC/DC step-up circuits, control a change of an output voltage of the one or more second DC/DC step-up circuits, wherein a change trend of the output voltage of the one or more second DC/DC step-up circuits and a change trend of an input voltage of the one or more first DC/DC step-up circuits in the IV curve scanning process present a non-strictly monotonically increasing relationship.

8. The apparatus according to claim 7, wherein the second control module comprises:

an adjustment unit, configured to: in the process of performing the IV curve scanning on the one or more first DC/DC step-up circuits, for any second DC/DC step-up circuit in the one or more second DC/DC step-up circuits, adjust an actual value of an output voltage of the second DC/DC step-up circuit at each moment based on a reference value of the output voltage of the second DC/DC step-up circuit at the same moment, until an absolute value of a difference between the actual value of the output voltage of the second DC/DC step-up circuit at each moment and the reference value of the output voltage at the same moment is less than a difference threshold, wherein a change trend of reference values of output voltages of the second DC/DC step-up circuit at all moments in the IV curve scanning process and a change trend of input voltages of the one or more first DC/DC step-up circuits at all the moments in the IV curve scanning process present a non-strictly monotonically increasing relationship.

9. The apparatus according to claim 8, wherein the adjustment unit is configured to:

for any moment in the IV curve scanning process, if a difference between the reference value of the output voltage at the moment and the actual value of the output voltage of the second DC/DC step-up circuit at the moment is greater than a reference threshold, increase power extracted by the second DC/DC step-up circuit from a connected photovoltaic string; or if a difference between the reference value of the output voltage at the moment and the actual value of the output voltage of the second DC/DC step-up circuit at the moment is greater than the reference threshold, reduce power extracted by the second DC/DC step-up circuit from a connected photovoltaic string.

10. The apparatus according to claim 7, further comprising:

a third control module, configured to: in the process of performing the IV curve scanning on the one or more first DC/DC step-up circuits, control a change of a switching frequency of the one or more first DC/DC step-up circuits, wherein a change trend of the switching frequency and the change trend of the input voltage of the one or more first DC/DC step-up circuits in the IV curve scanning process present a non-strictly monotonically decreasing relationship.

11. The apparatus according to claim 10, wherein the third control module is configured to:
for any first DC/DC step-up circuit in the one or more first DC/DC step-up circuits, at any moment in a plurality of moments in the IV curve scanning process, if an input voltage of the first DC/DC step-up circuit at the moment is less than an input voltage of the first DC/DC step-up circuit at a previous moment, adjust a switching frequency of the first DC/DC step-up circuit at the moment to be greater than or equal to a switching frequency of the first DC/DC step-up circuit at the previous moment; or
if an input voltage of the first DC/DC step-up circuit at the moment is greater than an input voltage of the first DC/DC step-up circuit at a previous moment, adjust a switching frequency of the first DC/DC step-up circuit at the moment to be less than or equal to a switching frequency of the first DC/DC step-up circuit at the previous moment.

12. The apparatus according to claim 7, further comprising:
an obtaining module, configured to: before the IV curve scanning is performed on the one or more first DC/DC step-up circuits, obtain maximum input power of each DC/DC step-up circuit comprised in the string inverter;
a first determining module, configured to determine a sum of maximum input power of all of the DC/DC step-up circuits comprised in the string inverter;
a second determining module, configured to multiply the sum by a power loss coefficient to obtain theoretical output power; and
a third determining module, configured to determine the reference power based on the theoretical output power, wherein a difference between the reference power and the theoretical output power is less than a power threshold.

13. A string inverter controller configured to perform the method according to claim 1.

14. A string inverter control system, comprising:
a string inverter comprising one or more first direct current/direct current (DC/DC) step-up circuits, one or more second DC/DC step-up circuits, and an inverter circuit, the one or more first DC/DC step-up circuits are DC/DC step-up circuits on which current-voltage (IV) curve scanning is performed, the one or more second DC/DC step-up circuits are DC/DC step-up circuits on which the IV curve scanning is not performed; and
a controller connected to each of DC/DC step-up circuits comprised in the string inverter, wherein the controller is configured to
in a process of performing the IV curve scanning on the one or more first DC/DC step-up circuits, control output power of the inverter circuit to be reference power, and
control a change of an output voltage of the one or more second DC/DC step-up circuits, wherein a change trend of the output voltage of the one or more second DC/DC step-up circuits and a change trend of an input voltage of the one or more first DC/DC step-up circuits in the IV curve scanning process present a non-strictly monotonically increasing relationship.

15. The system according to claim 14, wherein the controller is configured to control a change of a switching frequency of the one or more first DC/DC step-up circuits, wherein a change trend of the switching frequency and the change trend of the input voltage of the one or more first DC/DC step-up circuits in the IV curve scanning process present a non-strictly monotonically decreasing relationship.

16. The system according to claim 14, wherein the controller is configured to adjust an actual value of an output voltage of the second DC/DC step-up circuit at each moment based on a reference value of the output voltage at the same moment, until an absolute value of a difference between the actual value of the output voltage of the second DC/DC step-up circuit at each moment and the reference value of the output voltage at the same moment is less than a difference threshold, wherein a change trend of reference values of output voltages of the second DC/DC step-up circuit at all moments in the IV curve scanning process and a change trend of input voltages of the one or more first DC/DC step-up circuits at all the moments in the IV curve scanning process present a non-strictly monotonically increasing relationship.

17. The system according to claim 16, wherein if a difference between the reference value of the output voltage at the moment and the actual value of the output voltage of the second DC/DC step-up circuit at the moment is greater than a reference threshold, the controller is configured to increase power extracted by the second DC/DC step-up circuit from a connected photovoltaic string.

18. The system according to claim 16, wherein if a difference between the reference value of the output voltage at the moment and the actual value of the output voltage of the second DC/DC step-up circuit at the moment is greater than a reference threshold, the controller is configured to reduce power extracted by the second DC/DC step-up circuit from a connected photovoltaic string.

19. A non-transitory machine computer-readable storage medium having instructions stored therein, which when executed by a processor, cause the processor to perform the method according to claim 1.

* * * * *